United States Patent
Ohashi et al.

(10) Patent No.: US 8,307,638 B2
(45) Date of Patent: Nov. 13, 2012

(54) EXHAUST GAS PURIFICATION SYSTEM FOR INTERNAL COMBUSTION ENGINE

(75) Inventors: Nobumoto Ohashi, Susono (JP); Atsushi Hayashi, Susono (JP); Masahide Iida, Susono (JP); Kotaro Hayashi, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 397 days.

(21) Appl. No.: 12/450,065

(22) PCT Filed: Mar. 17, 2008

(86) PCT No.: PCT/JP2008/055348
§ 371 (c)(1), (2), (4) Date: Sep. 10, 2009

(87) PCT Pub. No.: WO2008/114878
PCT Pub. Date: Sep. 25, 2008

(65) Prior Publication Data
US 2010/0101217 A1   Apr. 29, 2010

(30) Foreign Application Priority Data
Mar. 16, 2007  (JP) ................ 2007-068213

(51) Int. Cl.
*F01N 3/00* (2006.01)
(52) U.S. Cl. ............. 60/295; 60/299; 60/311
(58) Field of Classification Search ......... 60/277, 60/285, 286, 295, 300
See application file for complete search history.

(56) References Cited

U.S. PATENT DOCUMENTS

| | | | |
|---|---|---|---|
| 5,201,802 A * | 4/1993 | Hirota et al. | ......... 60/276 |
| 6,378,298 B2 | 4/2002 | Harima et al. | |
| 7,063,642 B1 | 6/2006 | Hu et al. | |
| 7,347,043 B2 | 3/2008 | Tahara et al. | |
| 8,099,946 B2 | 1/2012 | Hinz et al. | |
| 2004/0093853 A1 * | 5/2004 | Hemingway et al. | ......... 60/275 |

(Continued)

FOREIGN PATENT DOCUMENTS

EP   1 081 360 A2   3/2001

(Continued)

OTHER PUBLICATIONS

Extended European Search Report issued in European Application No. 08738737.9 on Mar. 25, 2011.
Aug. 22, 2011 Office Action issued in U.S. Appl. No. 12/227,350.
Feb. 17, 2012 Office Action issued in U.S. Appl. No. 12/227,350.

*Primary Examiner* — Thomas Denion
*Assistant Examiner* — Patrick Maines
(74) *Attorney, Agent, or Firm* — Oliff & Berridge, PLC

(57) ABSTRACT

An object of the invention is to recover the capability of an exhaust gas purification apparatus provided in an exhaust passage of an internal combustion engine with improved reliability. According to the invention there are provided recovery control execution unit for executing a recovery control in which the temperature of the exhaust gas purification apparatus is raised by supply of reducing agent to a precatalyst to thereby recover the capability of the exhaust gas purification apparatus and prohibition range setting unit for setting a recovery control prohibition range that is an operation range of the internal combustion engine in which execution of the recovery control by the recovery control execution unit is prohibited. The higher the degree of deterioration of the precatalyst is, the higher the maximum values of the engine torque and the engine revolution number in the recovery control prohibition range are set to be.

9 Claims, 5 Drawing Sheets

U.S. PATENT DOCUMENTS

| | | | |
|---|---|---|---|
| 2004/0204289 A1* | 10/2004 | Inoue et al. | 477/107 |
| 2004/0216451 A1* | 11/2004 | LaBarge et al. | 60/286 |
| 2005/0050881 A1* | 3/2005 | Toshioka et al. | 60/285 |
| 2005/0126161 A1* | 6/2005 | Otake et al. | 60/277 |
| 2005/0252197 A1 | 11/2005 | Nieuwstadt et al. | |
| 2006/0225407 A1* | 10/2006 | Tahara et al. | 60/286 |
| 2007/0006570 A1* | 1/2007 | Gieshoff et al. | 60/277 |
| 2007/0214773 A1* | 9/2007 | Elwart | 60/285 |
| 2007/0289287 A1* | 12/2007 | Tahara et al. | 60/277 |
| 2008/0264037 A1* | 10/2008 | Takahashi et al. | 60/277 |
| 2009/0044517 A1* | 2/2009 | Oba | 60/285 |

FOREIGN PATENT DOCUMENTS

| | | |
|---|---|---|
| EP | 1 790 837 A1 | 5/2007 |
| JP | A-09-164320 | 6/1997 |
| JP | A-2001-73749 | 3/2001 |
| JP | A-2001-342879 | 12/2001 |
| JP | A-2004-353606 | 12/2004 |
| JP | A-2005-171809 | 6/2005 |
| JP | A-2006-17056 | 1/2006 |
| WO | WO 2007060785 A1 * | 5/2007 |

* cited by examiner

EXHAUST GAS PURIFICATION SYSTEM FOR INTERNAL COMBUSTION ENGINE

This application is the national phase application under 35 U.S.C. §371 of PCT international application No. PCT/JP2008/055348 filed on 17 Mar. 2008, which claims priority to Japanese patent application No. 2007-068213 filed on 16 Mar. 2007, the contents of which are incorporated herein by reference.

TECHNICAL FIELD

The present invention relates to an exhaust gas purification system for an internal combustion engine.

BACKGROUND ART

There are cases where a precatalyst having oxidizing ability is provided in the exhaust passage of an internal combustion engine upstream of an exhaust gas purification apparatus such as a NOx storage reduction catalyst (which will be hereinafter referred to as a NOx catalyst), a particulate filter (which will be hereinafter referred to as a filter) or the like. In such cases, when the temperature of the exhaust gas purification apparatus is to be raised in order to recover the capability of the exhaust gas purification apparatus, a reducing agent is supplied to the precatalyst. The reducing agent thus supplied is oxidized by the precatalyst, and the temperature of the exhaust gas purification apparatus is raised by heat of oxidation generated thereby.

In an arrangement disclosed in Japanese Patent Application Laid-Open No. 2001-342879, a NOx catalyst is provided in the exhaust passage of an internal combustion engine, and a precatalyst is provided in the exhaust passage upstream of the NOx catalyst. This patent document 1 discloses a technology of controlling the air-fuel ratio of the exhaust gas in accordance with the degree of deterioration of the precatalyst when NOx stored in the NOx catalyst is reduced. Furthermore, Japanese Patent Application Laid-Open No. 2001-073749 discloses a technology in which when the temperature of a catalyst provided in the exhaust passage of an internal combustion engine is raised upon starting the vehicle, a time period over which the temperature of the catalyst is raised is determined in accordance with the degree of deterioration of the catalyst.

DISCLOSURE OF THE INVENTION

The oxidizing capability of a precatalyst decreases with an increase in the degree of deterioration. In a state in which the oxidizing capability of the precatalyst is unduly low, even if a reducing agent is supplied to the precatalyst, it is sometimes difficult to raise the temperature of the exhaust gas purification apparatus sufficiently, because the reducing agent is not oxidized sufficiently in the precatalyst. In this case, it is difficult to recover the capability of the exhaust gas purification apparatus.

The present invention has been made in view of the above described problem and has as an object to provide a technology that enables recovery of the capability of an exhaust gas purification apparatus provided in the exhaust passage of an internal combustion engine with improved reliability.

According to the invention, there is provided recovery control execution unit for executing a recovery control in which the temperature of the exhaust gas purification apparatus is raised by supply of reducing agent to a precatalyst to thereby recover the capability of the exhaust gas purification apparatus. In addition, according to the present invention, the higher the degree of deterioration of the precatalyst is, the more an operation range of the internal combustion engine in which execution of the recovery control by the recovery control execution unit is prohibited is extended.

More specifically, an exhaust gas purification system for an internal combustion engine according to the present invention is characterized by comprising:
an exhaust gas purification apparatus provided in an exhaust passage of an internal combustion engine;
a precatalyst having oxidizing ability provided in the exhaust passage upstream of the exhaust gas purification apparatus;
reducing agent supply unit for supplying reducing agent to the precatalyst;
recovery control execution unit for executing a recovery control in which the reducing agent is supplied to said precatalyst by the reducing agent supply unit to thereby raise the temperature of said exhaust gas purification apparatus, whereby a capability of said exhaust gas purification apparatus is recovered;
deterioration degree detection unit for detecting a degree of deterioration of said precatalyst; and
prohibition range setting unit for setting a recovery control prohibition range that is an operation range of said internal combustion engine in which execution of the recovery control by said recovery control execution unit is prohibited, based on the degree of deterioration of said precatalyst detected by said deterioration degree detection unit,
wherein the higher the degree of deterioration of said precatalyst is, the higher the maximum values of the engine torque and the engine revolution number in the recovery control prohibition range set by said prohibition range setting unit are.

According to the present invention, when the operation state of the internal combustion engine falls within the recovery control prohibition range, execution of the recovery control is prohibited. In addition, the higher the degree of deterioration of the precatalyst is, the higher the maximum values of the engine torque and the engine revolution number in the recovery control prohibition range are set to be. In other words, the recovery control prohibition range is extended to an operation range in which the temperature of the exhaust gas from the internal combustion engine is higher, as the degree of deterioration of the precatalyst increases.

To achieve oxidation of the reducing agent in the precatalyst, the higher the degree of deterioration of the precatalyst is, the higher the temperature of the precatalyst at the time when the reducing agent is supplied is required to be. The higher the temperature of the exhaust gas is, the higher the temperature of the oxidation catalyst becomes.

According to the present invention, the higher the degree of deterioration of the precatalyst is, the higher the temperature at which execution of the recovery control is allowed is made. In other words, the higher the degree of deterioration of the precatalyst is, the higher the temperature of the precatalyst at the time when the recovery control is executed is. Therefore, when the recovery control is executed, the capability of the exhaust gas purification apparatus can be recovered with higher reliability In the present invention, exhaust gas temperature raising control execution unit for executing an exhaust gas temperature raising control for raising the temperature of the exhaust gas from the internal combustion engine may further be provided. In this case, if the operation state of the internal combustion engine falls within the recovery control prohibition range at a time when the condition for executing the recovery control is met, the exhaust gas temperature raising control may be executed by the exhaust gas temperature raising control unit, and thereafter the recovery control may be executed by the recovery control execution unit.

Even when the operation state of the internal combustion engine falls within the recovery control prohibition range, the temperature of the precatalyst can be made higher by executing the exhaust gas temperature raising control. Therefore, even when the operation state of the internal combustion engine falls within the recovery control prohibition range, the capability of the exhaust gas purification apparatus can be recovered as above.

In the above described case, when the exhaust gas temperature raising control is executed by the exhaust gas temperature raising control unit, the higher the degree of deterioration of the precatalyst is, the higher the temperature to which the temperature of the exhaust gas from the internal combustion engine is raised may be made.

By this method, deficiency of oxidation of the reducing agent in the precatalyst can be prevented when the recovery control is executed.

In the present invention, the exhaust gas purification apparatus may be a NOx catalyst, and the recovery control may be a SOx poisoning recovery control for reducing SOx stored in the NOx catalyst.

In this case, SOx stored in the NOx catalyst can be reduced with higher reliability.

In the present invention, the exhaust gas purification apparatus may be a particulate filter, and the recovery control may be a filter regeneration control for removing particulate matter (which will be hereinafter referred to as PM) trapped on the particulate filter.

In this case, PM trapped on the filter can be removed with higher reliability.

THE BEST MODE FOR CARRYING OUT THE INVENTION

In the following, a specific embodiment of the exhaust gas purification system for an internal combustion engine according to the present invention will be described with reference to the drawings.

Embodiment 1

(General Configuration of Air-Intake and Exhaust System of Internal Combustion Engine)

Figure 1:
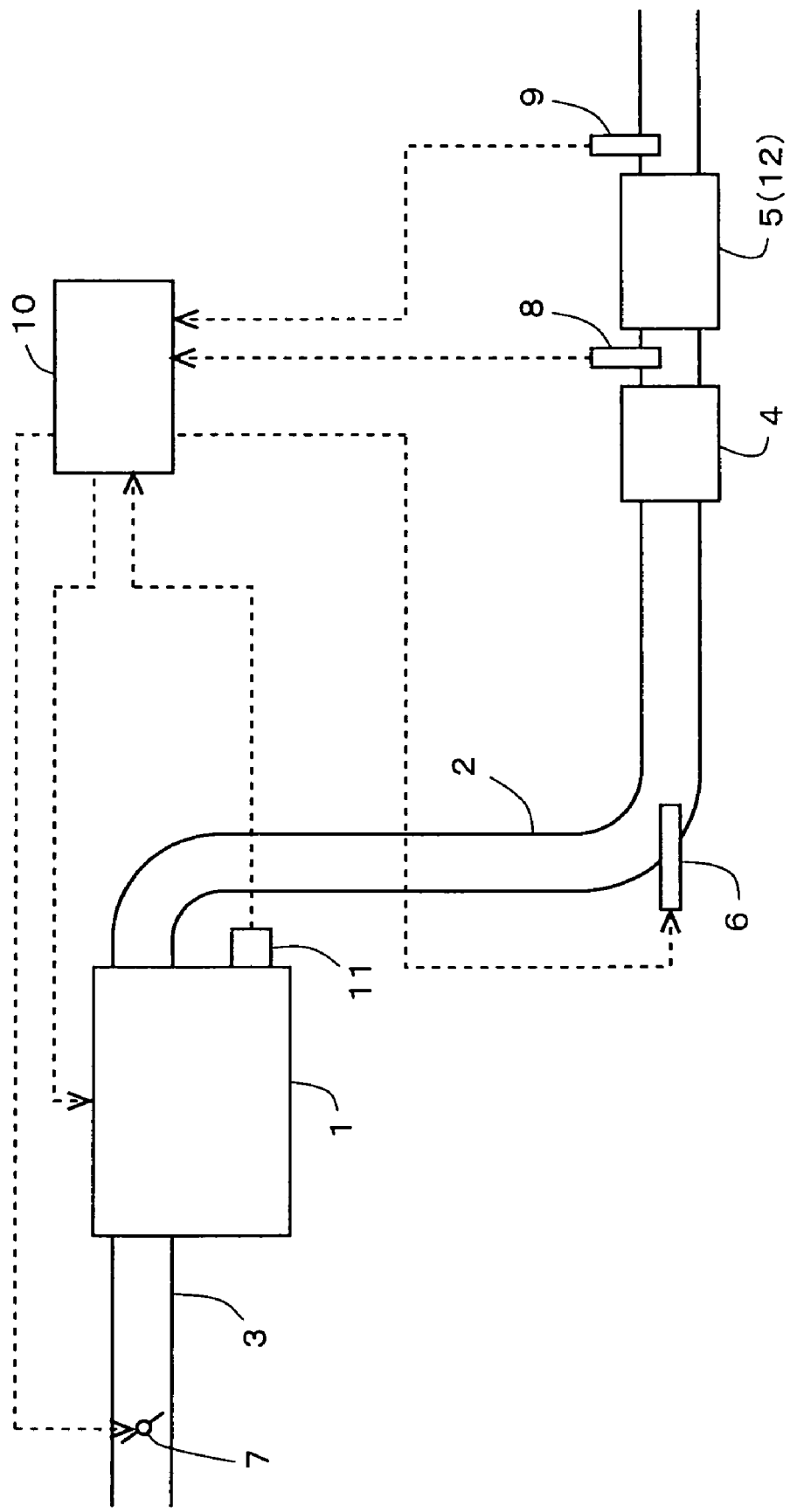
FIG. 1 is a diagram showing the general configuration of an air-intake and exhaust system of an internal combustion engine according to embodiment 1.

Here, a case in which the present invention is applied to a diesel engine for driving a vehicle will be described by way of example. FIG. 1 is a diagram showing the general configuration of the air-intake and exhaust system of an internal combustion engine according to this embodiment.

The internal combustion engine 1 is a diesel engine for driving a vehicle. To the internal combustion engine 1 are connected an intake passage 3 and an exhaust passage 2. A throttle valve 7 is provided in the intake passage 3. A NOx catalyst 5 is provided in the exhaust passage 2. An oxidation catalyst 4 is provided in the exhaust passage 2 upstream of the NOx catalyst 5.

In this embodiment, the NOx catalyst 5 corresponds to the exhaust gas purification apparatus according this embodiment, and the oxidation catalyst 4 corresponds to the precatalyst according to the present invention. The oxidation catalyst 4 may be replaced by a catalyst having an oxidizing ability other than the oxidation catalyst.

A fuel addition valve 6 that adds fuel serving as reducing agent to the exhaust gas is provided in the exhaust passage 2 upstream of the oxidation catalyst 4. In this embodiment, the fuel addition valve 6 corresponds to the reducing agent supply unit.

A first temperature sensor 8 that senses the temperature of the exhaust gas is provided in the exhaust passage 2 between the oxidation catalyst 4 and the NOx catalyst 5. A second temperature sensor 9 that senses the temperature of the exhaust gas is provided in the exhaust passage 2 downstream of the NOx catalyst 5.

To the internal combustion engine 1 having the above described configuration is annexed an electronic control unit (ECU) 10 for controlling the internal combustion engine 1. The ECU 10 is electrically connected with the first temperature sensor 8, the second temperature sensor 9, and a crank position sensor 11. Output signals of these sensors are input to the ECU 10. The ECU 10 estimates the temperature of the oxidation catalyst 4 based on the output value of the first temperature sensor 8 and estimates the temperature of the NOx catalyst 5 based on the output value of the second temperature sensor 9.

The ECU 10 is electrically connected also with the throttle valve 7, the fuel addition valve 6, and a fuel injection valve of the internal combustion engine 1. These components are controlled by the ECU 10.

(NOx Reduction Control and SOx Poisoning Recovery Control)

In this embodiment, a NOx reduction control and a SOx poisoning recovery control are performed. The NOx reduction control is a control for reducing NOx stored in the NOx catalyst 5. The SOx poisoning recovery control is a control for recovering the NOx storage capability of the NOx catalyst 5 by reducing SOx stored in the NOx catalyst 5. Both of the NOx reduction control and the SOx poisoning recovery control according to this embodiment are performed by adding fuel intermittently through the fuel addition valve 6.

In the NOx reduction control, the air-fuel ratio of the exhaust gas flowing into the NOx catalyst 5 is lowered to a specific NOx reduction air-fuel ratio by adding fuel intermittently through the fuel addition valve 6. The NOx reduction air-fuel ratio is such an air-fuel ratio that enables reduction of NOx stored in the NOx catalyst 5.

In the SOx poisoning recovery control, it is necessary to lower the air-fuel ratio of the exhaust gas flowing into the NOx catalyst 5 to a specific SOx reduction air-fuel ratio and to raise the temperature of the NOx catalyst 5 to a specific SOx reduction temperature, by adding fuel intermittently through the fuel addition valve 6. Fuel added through the fuel addition valve 6 is supplied to the oxidation catalyst 4 before it reaches the NOx catalyst 5. As fuel is oxidized in the oxidation catalyst 4, the temperature of the oxidation catalyst 4 is raised by the heat of oxidation, and the temperature of the NOx catalyst 5 is also raised thereby. The SOx reduction air-fuel ratio and the SOx reduction temperature are such an air-fuel ratio and a temperature that enable reduction of SOx stored in the NOx catalyst 5.

If SOx stored in the NOx catalyst 5 is reduced by execution of the SOx poisoning recovery control, the NOx storing capability of the NOx catalyst 5 is recovered. In this embodiment, the SOx poisoning recovery control corresponds to the recovery control according to the present invention.

(Method of Detecting the Degree of Deterioration of Oxidation Catalyst)

Figure 2:
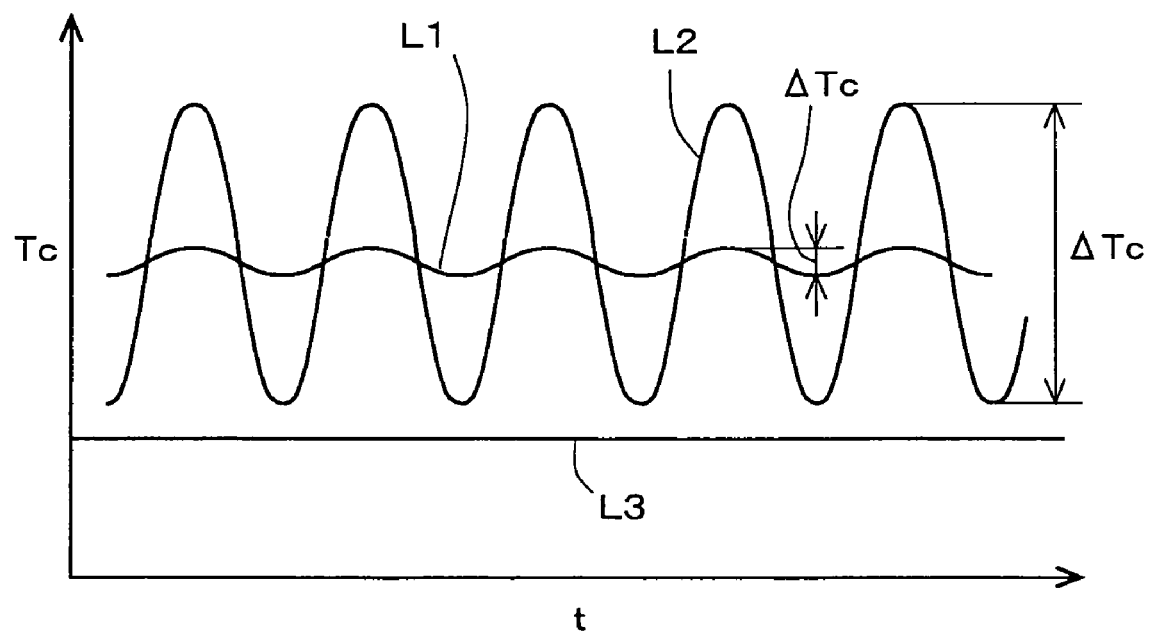
FIG. 2 shows changes in the temperature of the NOx catalyst during execution of the NOx reduction control.

In this embodiment, when the NOx reduction control is executed, the degree of deterioration of the oxidation catalyst 4 is detected. Here, the method of detecting the degree of deterioration of the oxidation catalyst 4 according to the present invention will be described with reference to FIG. 2. FIG. 2 shows changes in the temperature of the NOx catalyst 5 while the NOx reduction control is executed in this embodiment. In FIG. 2, the vertical axis represents the temperature Tc of the Nox catalyst 5 and the horizontal axis represents time t.

In FIG. 2, curve L1 represents changes in the temperature of the NOx catalyst 5 in a state in which the degree of deterioration of the oxidation catalyst 4 is relatively low, and curve L2 represents changes in the temperature of the NOx catalyst 5 in a state in which the degree of deterioration of the oxidation catalyst 4 is relatively high. Line L3 represents the temperature of the exhaust gas flowing in the exhaust passage 2 upstream of the oxidation catalyst 4.

As described above, at the time when the NOx reduction control is carried out, fuel added through the fuel injection valve 6 is supplied to the oxidation catalyst before it reaches the NOx catalyst 5. Then, the temperature of the oxidation catalyst 4 is increased by oxidation heat generated by oxidation of fuel in the oxidation catalyst 4, whereby the temperature of the NOx catalyst 5 is also increased.

When fuel is added intermittently through the fuel addition valve 6 in a state in which the degree of deterioration of the oxidation catalyst 4 is relatively low, a large portion of fuel thus added is oxidized in the oxidation catalyst 4. In consequence, the temperature of the oxidation catalyst 4 becomes higher, and the temperature of the NOx catalyst 5 also becomes higher. In this case, the quantity of fuel that reaches the NOx catalyst 5 and the quantity of oxygen contained in the exhaust gas that reaches the NOx catalyst 5 are relatively small. Therefore, the quantity of fuel oxidized in the NOx catalyst 5 is necessarily small. Consequently, the quantity of heat generated by oxidation of fuel in the NOx catalyst 5 is small. Therefore, in a case where the NOx reduction control is carried out in a state in which the degree of deterioration of the oxidation catalyst 4 is relatively low, although the temperature of the NOx catalyst 5 itself becomes higher, the magnitude of changes ΔTc in the temperature of the NOx catalyst 5 (which will be simply referred to as the magnitude of temperature changes ΔTc of the NOx catalyst 5 hereinafter) during intermittent fuel addition is small.

On the other hand, in a case where the degree of deterioration of the oxidation catalyst 4 is relatively high, fuel added through the fuel addition valve 6 is hard to be oxidized. Therefore, even if intermittent fuel addition through the fuel addition valve 6 is executed, the temperature of the oxidation catalyst 4 is unlikely to rise. Accordingly, a rise in the temperature of the NOx catalyst 5 resulting from an increase in the temperature of the oxidation catalyst 4 is small. In this case, the quantity of fuel that reaches the NOx catalyst 5 and the quantity of oxygen contained in the exhaust gas are relatively large. In consequence, the quantity of oxidation heat generated by oxidation of fuel in the NOx catalyst 5 is large.

Thus, the difference in the temperature of the NOx catalyst 5 at the time when fuel is supplied to the NOx catalyst 5 and that at the time when fuel is not supplied thereto is large. In other words, in a case where the NOx reduction control is performed in a state in which the degree of deterioration of the oxidation catalyst 4 is relatively high, the magnitude of temperature changes ΔTc of the NOx catalyst 5 becomes large, as shown by curve L2 in FIG. 2.

Therefore, in this embodiment, the degree of deterioration of the oxidation catalyst 4 is detected based on the magnitude of temperature changes ΔTc of the NOx catalyst 5 during execution of the NOx reduction control. Specifically, the larger the magnitude of temperature changes ΔTc of the NOx catalyst 5 during execution of the NOx reduction control is, the higher the degree of deterioration of the oxidation catalyst 4 is determined to be. In this embodiment, the ECU 10 that executes detection of the degree of the deterioration of the oxidation catalyst 4 corresponds to the deterioration degree detection unit according to the present invention.

(Setting of SOx Poisoning Recovery Control Prohibition Range)

Figure 3:
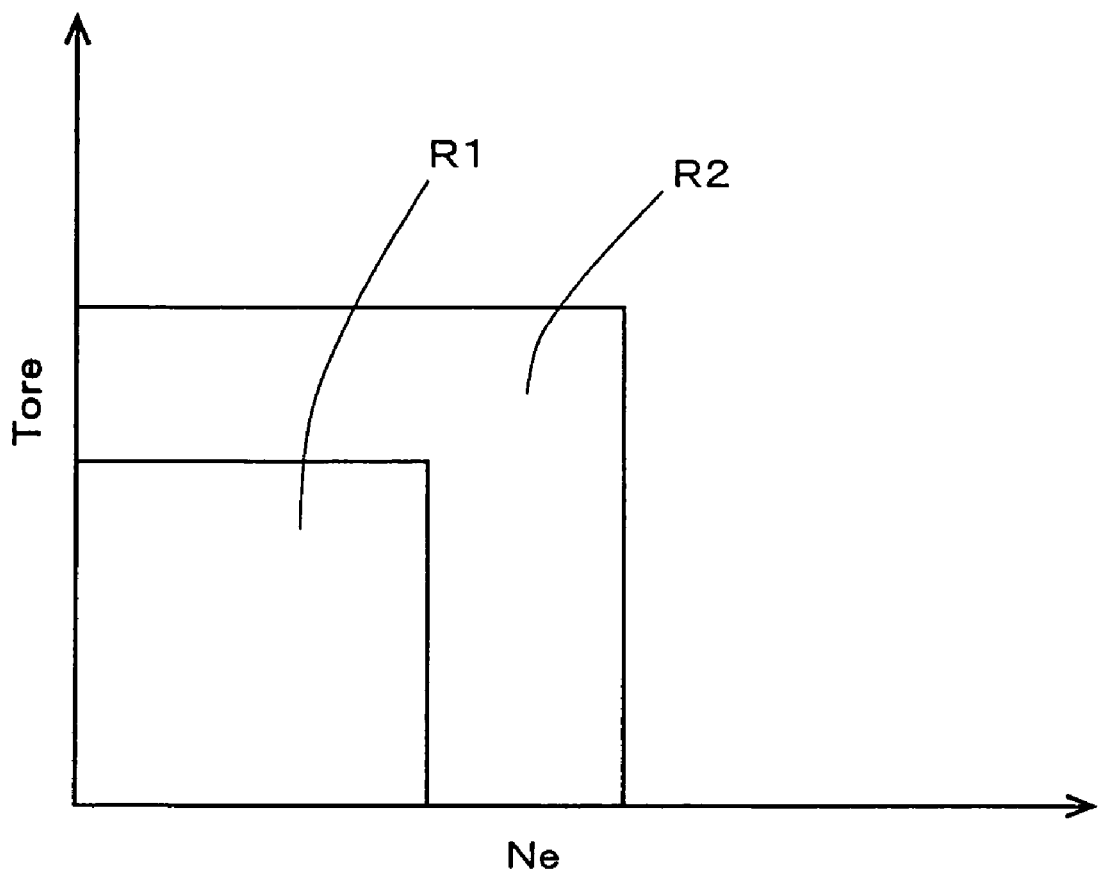
FIG. 3 shows a SOx poisoning recovery control prohibition range.

Next, a way of setting an SOx poisoning recovery control prohibition range, that is, an operation range of the internal combustion engine 1 in which execution of the SOx poisoning recovery control is prohibited, will be described with reference to FIG. 3. FIG. 3 is a diagram showing the poisoning recovery prohibition range. In FIG. 3, area 1 represents the SOx poisoning recovery control prohibition range at the time when the degree of deterioration of the oxidation catalyst 4 is relatively low, and area 2 represents the SOx poisoning recovery control prohibition range at the time when the degree of deterioration of the oxidation catalyst 4 is relatively high. In FIG. 3, the vertical axis represents the engine torque Tore of the internal combustion engine 1, and the horizontal axis represents the engine revolution number (or engine speed) Ne of the internal combustion engine 1. In this way, in this embodiment, the SOx poisoning recovery control prohibition range is defined in terms of the engine torque Tore and the engine revolution number Ne of the internal combustion engine 1. In this embodiment, the engine torque of the internal combustion engine 1 is calculated based on the fuel injection quantity in the internal combustion engine 1, and the engine revolution number of the internal combustion engine 1 is calculated based on measurement values of the crank position sensor 11.

When the temperature of the exhaust gas is low, the temperature of the oxidation catalyst 4 is also low. In a state in which the temperature of the oxidation catalyst 4 is low, even if fuel is supplied to the oxidation catalyst 4 by execution of the SOx poisoning recovery control, the fuel is hard to be oxidized in the oxidation catalyst 4, and it is sometimes difficult to raise the temperature of the NOx catalyst 5 to the SOx reduction temperature. Therefore, as shown in FIG. 3, the SOx poisoning recovery control prohibition range is set as a range in which the temperature of the exhaust gas is low, that is, a range in which the engine torque Tore is low and the engine revolution number Ne is low.

The higher the degree of deterioration of the oxidation catalyst 4 is, the harder the supplied fuel is to be oxidized. Therefore, in this embodiment, the degree of deterioration of the oxidation catalyst 4 is detected by the above described method, and the SOx poisoning recovery control prohibition range is changed based on the degree of deterioration thus detected. More specifically, as shown in FIG. 3, the higher the degree of deterioration of the oxidation catalyst 4 is, the higher the maximum values of the engine torque Tore and the engine revolution number Ne in the SOx poisoning recovery control prohibition range are set to be. In other words, the higher the degree of deterioration of the oxidation catalyst 4 is, the more the SOx poisoning recovery control prohibition range is extended to include an operation range in which the temperature of the exhaust gas is higher.

From this follows that the higher the degree of deterioration of the oxidation catalyst 4 is, the higher the temperature at which execution of the SOx poisoning recovery control is allowed is. In other words, the higher the degree of deterioration of the oxidation catalyst 4 is, the higher the temperature of the oxidation catalyst 4 at which the SOx poisoning recovery control is executed is. Therefore, according to this embodiment, SOx stored in the NOx catalyst 5 can be reduced with higher reliability when the SOx poisoning recovery control is executed.

Furthermore, according to this embodiment, the SOx reduction control is prevented from being performed in a state in which it is difficult to raise the temperature of the NOx catalyst 5 to the SOx reduction temperature. This prevents unnecessary fuel addition through the fuel addition valve 6 from being performed. Consequently, deterioration of fuel economy can be prevented. In addition, fuel added through the fuel addition valve 6 can be prevented from slipping through the oxidation catalyst 4 and the NOx catalyst 5 and being emitted to the exterior.

(SOX Poisoning Recovery Control Routine)

Figure 4:
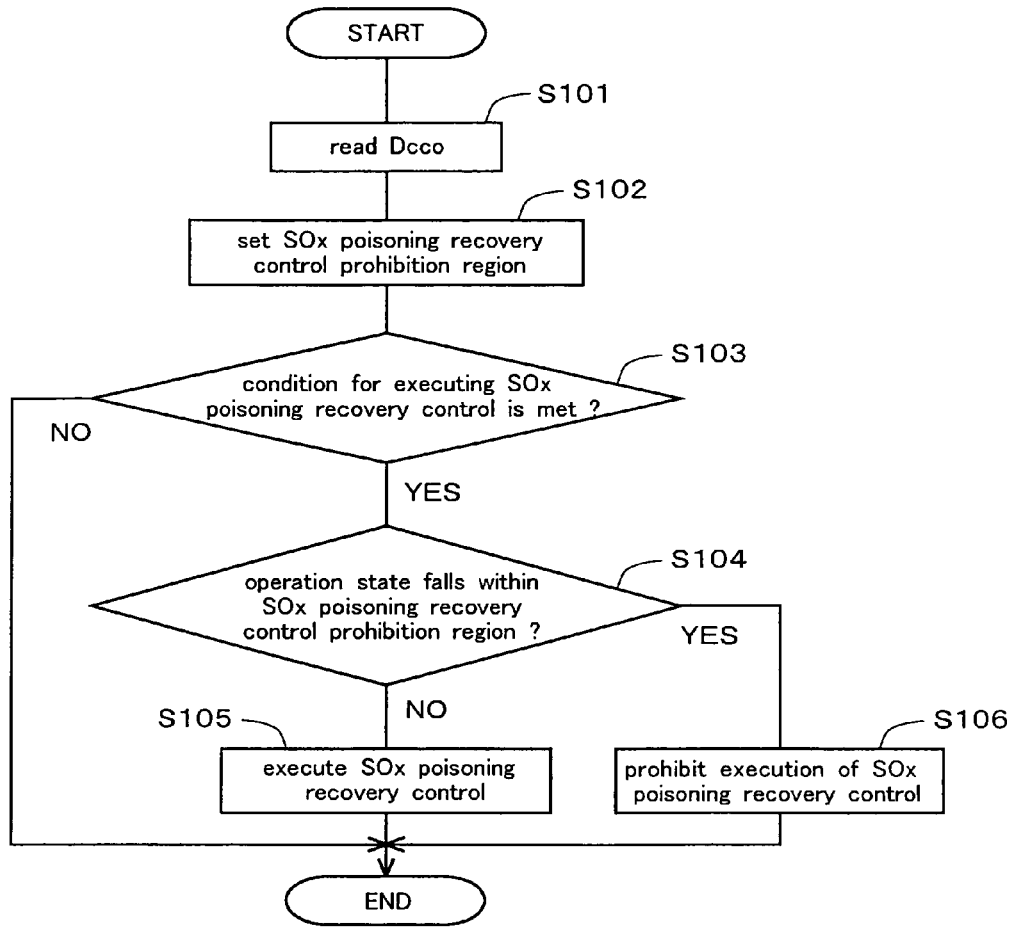
FIG. 4 is a flow chart of a routine of a SOx poisoning recovery control according to embodiment 1.

Here, an SOx poisoning recovery control routine according to this embodiment will be described with reference to the flow chart shown in FIG. 4. This routine is stored in advance in the ECU 10 and executed repeatedly at predetermined intervals during operation of the internal combustion engine 1.

In this routine, first in step S101, the ECU 10 reads the degree of deterioration Dcco of the oxidation catalyst 4. In this embodiment, the degree of deterioration of the oxidation catalyst 4 is detected during execution of the NOx reduction control. The detected degree of deterioration Dcco of the oxidation catalyst 4 is stored in the ECU 10. In step S101, the degree of deterioration Dcco of the oxidation catalyst 4 thus stored is read.

Next, the ECU 10 proceeds to step S102, where it sets an SOx poisoning recovery control prohibition range based on the degree of deterioration Dcco of the oxidation catalyst 4 read in step S101. In this step, the higher the degree of deterioration of the oxidation catalyst 4 is, the higher the maximum values of the engine torque Tore and the engine revolution number Ne in the SOx poisoning recovery control prohibition range are set to be, as described above. In this embodiment, the ECU 10 that executes this step S102 corresponds to the prohibition range setting unit according to the present invention.

Next, the ECU 10 proceeds to step S103, where it determines whether or not a condition for executing the SOx poisoning recovery control has been met. In this step, if the estimated value of the amount of SOx stored in the NOx catalyst 5 has exceeded a predetermined value, it may be determined that the condition for executing the SOx poisoning recovery control has been met. If the determination in step S102 is affirmative, the ECU 10 proceeds to step S104, and if the determination is negative, the ECU 10 once terminates execution of this routine.

In step S104, the ECU 10 determines whether or not the operation state of the internal combustion engine 1 falls within the SOx poisoning recovery control prohibition range set in step S102. If the determination in step S104 is affirmative, the ECU 10 proceeds to step S106, and if the determination in step S104 is negative, the ECU 10 proceeds to step S105.

In step S105, the ECU 10 starts intermittent addition of fuel through the fuel addition valve 6 to execute the SOx poisoning recovery control. Thereafter, the ECU 10 once terminates execution of this routine. In this embodiment, the ECU 20 that executes this step S105 corresponds to recovery control execution unit.

On the other hand, in step S106, the ECU 10 prohibits execution of the SOx poisoning recovery control. Thereafter, the ECU 10 once terminates execution of this routine.

Embodiment 2

The general configuration of the air-intake and exhaust system of an internal combustion engine according to this embodiment is the same as that in embodiment 1. In this embodiment also, the NOx reduction control and the SOx poisoning recovery control same as those in embodiment 1 are performed. In addition, in this embodiment also, an SOx poisoning recovery control prohibition range is set in the same manner as embodiment 1.

(Exhaust Gas Temperature Raising Control)

In this embodiment, if the operation state of the internal combustion engine 1 falls within the SOx poisoning recovery control prohibition range at a time when the condition for executing the SOx poisoning recovery control is met, an exhaust gas temperature raising control for raising the temperature of the exhaust gas from the internal combustion engine 1. Then, after the temperature of the oxidation catalyst 4 has risen with a rise in the temperature of the exhaust gas, the SOx poisoning recovery control is executed.

Even at a time when the operation state of the internal combustion engine 1 falls within the SOx poisoning recovery control prohibition range, the temperature of the oxidation catalyst 4 can be raised to a temperature that enables adequate oxidation of fuel, by executing the exhaust gas temperature raising control to raise the temperature of the exhaust gas. Therefore, according to this embodiment, SOx stored in the NOx catalyst 5 can be reduced even when the operation state of the internal combustion engine 1 falls within the SOx poisoning recovery control prohibition range.

The exhaust gas temperature raising control according to this embodiment can be exemplified by a control for effecting sub fuel injection during the expansion stroke of the internal combustion engine 1, or a control for decreasing the degree of opening of the throttle valve 7. In a case where an EGR apparatus that introduces a portion of the exhaust gas flowing in the exhaust passage 2 to the intake passage 3 is provided, a control for increasing the amount of the exhaust gas (EGR gas) introduced into the intake passage 3 may be used as the exhaust gas temperature increasing control.

(Routine of Sox Poisoning Recovery Control)

Figure 5:
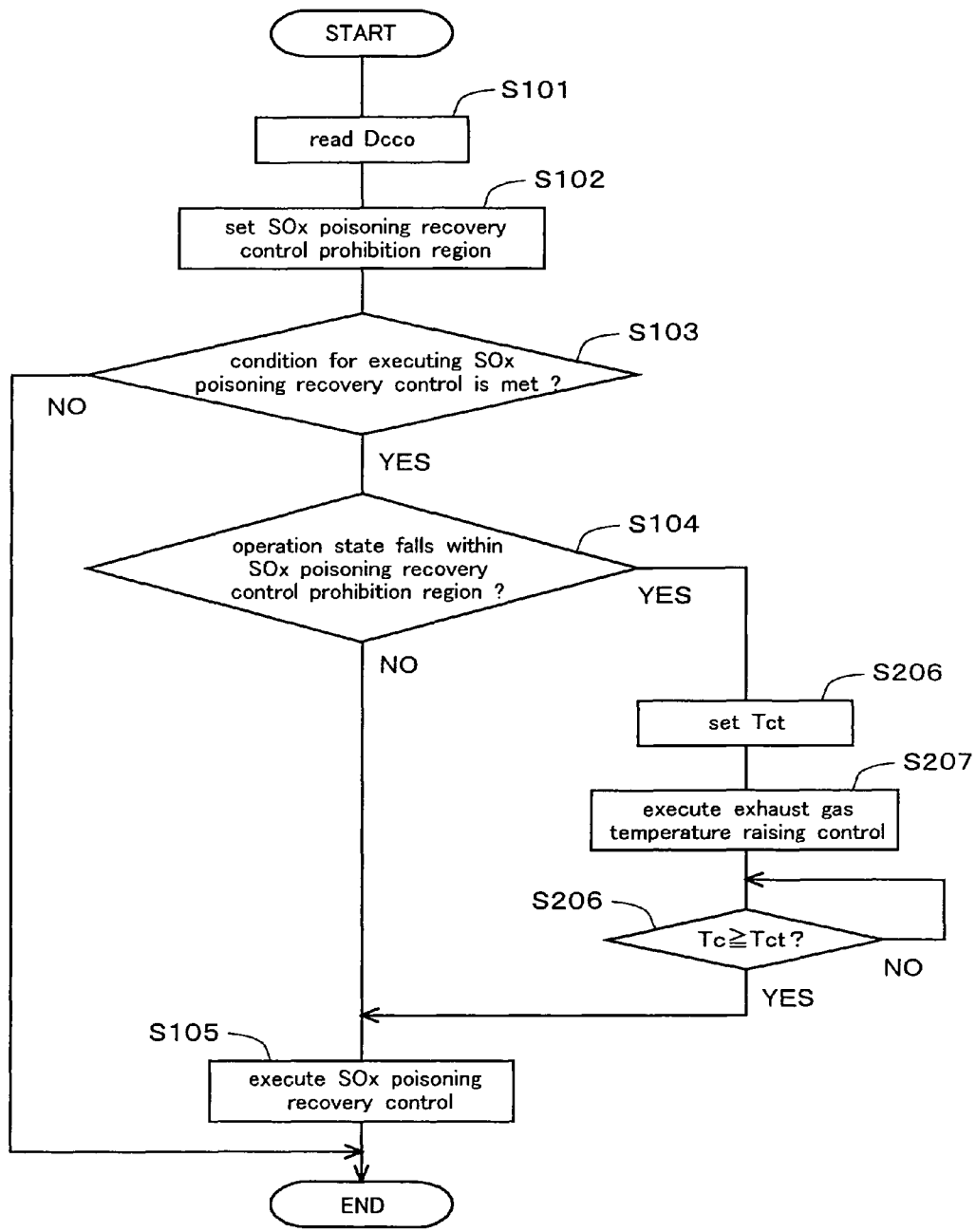
FIG. 5 is a flow chart of a routine of a SOx poisoning recovery control according to embodiment 2.

Here, a routine of the SOx poisoning recovery control according to this embodiment will be described with reference to the flow chart shown in FIG. 5. This routine is stored in advance in the ECU 10 and executed repeatedly at predetermined intervals during operation of the internal combustion engine 1. Steps S101 to S105 in this routine are the same as those in the SOx poisoning recovery control routine according to embodiment 1. Therefore, descriptions of these steps will be omitted, and only steps S206 to S208 will be described.

In this routine, if the determination in step S104 is affirmative, the ECU 10 proceeds to step S206. In step S206, the ECU 10 sets a target temperature Tct of the oxidation catalyst 4 in executing the exhaust gas temperature raising control based on the degree of deterioration Dcco of the oxidation catalyst 4 read in step S101. In this step, the higher the degree of deterioration Dcco of the oxidation catalyst 4 is, the higher the target temperature Tct is set. Here, the target temperature Tct is a temperature that enables adequate oxidation of fuel in the oxidation catalyst 4. Therefore, by executing the SOx poisoning recovery control in a state in which the temperature of the oxidation catalyst 4 has been raised to the target temperature Tct, the temperature of the NOx catalyst 5 can be raised to the SOx reduction temperature.

Next, the ECU 10 proceeds to step S207, where it executes the exhaust gas temperature raising control. As described above, the higher the degree of deterioration Dcco of the oxidation catalyst 4 is, the higher the target temperature Tct that has been set is. Therefore, during execution of the exhaust gas temperature raising control, the higher the degree of deterioration Dcco of the oxidation catalyst 4 is, the higher the temperature to which the temperature of the exhaust gas is raised is. In this embodiment, the ECU that executes this step S207 corresponds to the exhaust gas temperature raising control execution unit. Next, the ECU 10 proceeds to step S208, where it determines whether or not the temperature Tc of the oxidation catalyst 4 has risen to a temperature not lower than the target temperature Tct. If the determination in step S208 is affirmative, the ECU 10 proceeds to step S105, and if the determination is negative, the ECU 10 executes step S208 again.

According to the above described routine, if the operation state of the internal combustion engine 1 falls within the SOx poisoning recovery control prohibition range at a time when the condition for executing the SOx poisoning recovery control is met, the exhaust gas temperature raising control is executed. Then, after the temperature of the oxidation catalyst 4 has risen to a temperature not lower than the target temperature Tct, the SOx poisoning recovery control is executed.

The higher the degree of deterioration of the oxidation catalyst 4 is, the higher the temperature to which the temperature of the exhaust gas is raised by the exhaust gas temperature raising control is, whereby the temperature of the oxidation catalyst 4 is raised to a higher temperature. Thus, when the SOx poisoning recovery control is executed, deficiency in oxidation of fuel in the oxidation catalyst 4 can be prevented. Therefore, SOx stored in the NOx catalyst 5 can be reduced with higher reliability.

Although in the cases described in embodiments 1 and 2 the exhaust gas purification apparatus according to the present invention is the NOx catalyst 5, a filter 12 may be provided in place of the NOx catalyst 5 (see reference numeral 12 for the filter indicated in parentheses in FIG. 1). In this case, the temperature of the oxidation catalyst 4 is raised by supplying fuel to the oxidation catalyst 4 through the fuel addition valve 6 thereby raising the temperature of the filter 12, whereby a filter regeneration process for removing the PM trapped on the filter 12 is carried out. This filter regeneration control corresponds to the recovery control according to the present invention.

In addition, a filter regeneration control prohibition range in which execution of the filter regeneration control is prohibited is set in a manner similar to that for the above-described SOx poisoning recovery prohibition range. Specifically, the higher the degree of deterioration of oxidation catalyst 4 is, the higher the maximum values of the engine torque and the engine rotation number in the filter regeneration control prohibition range are set to be. Thus, the higher the degree of deterioration of the oxidation catalyst 4 is, the higher the temperature of the oxidation catalyst 4 at which the filter regeneration control is executed is. Therefore, according to this embodiment, the PM trapped on the filter 12 can be removed with higher reliability when the filter regeneration control is executed.

In the case of embodiment 2, if the operation state of the internal combustion engine 1 falls within the filter regeneration control prohibition range at a time when the condition for executing the filter regeneration control is met, an exhaust gas temperature raising control for raising the temperature of the exhaust gas from the internal combustion engine 1 is executed. Then, after the temperature of the oxidation catalyst 4 has risen with a rise in the temperature of the exhaust gas, the filter regeneration control is executed. Therefore, the PM trapped on the filter 12 can be removed even at a time when the operation state of the internal combustion engine 1 falls within the filter regeneration control prohibition range.

In embodiments 1 and 2, fuel may be supplied to the oxidation catalyst 4 by performing sub fuel injection in the internal combustion engine 1, instead of the fuel addition valve 6, at a timing at which the fuel is discharged from the internal combustion engine 1 in an unburned state. In this case, the ECU 10 that executes sub fuel injection at the above-described timing corresponds to the reducing agent supply unit according to the present invention.

INDUSTRIAL APPLICABILITY

According to the present invention, the capability of an exhaust gas purification apparatus can be recovered with an improved reliability.

The invention claimed is:

1. An exhaust gas purification system for an internal combustion engine comprising:
   an exhaust gas purification apparatus provided in an exhaust passage of an internal combustion engine;
   a precatalyst having oxidizing ability provided in the exhaust passage upstream of the exhaust gas purification apparatus;
   reducing agent supply apparatus for supplying reducing agent to the precatalyst;
   at least one controller configured to:
      execute a recovery control in which the reducing agent is supplied to the precatalyst by the reducing agent supply apparatus to thereby raise the temperature of the exhaust gas purification apparatus, whereby a capability of the exhaust gas purification apparatus is recovered;
   detect a degree of deterioration of the precatalyst; and
   set a recovery control prohibition range that is an operation range of the internal combustion engine in which execution of the recovery control by the at least one controller is prohibited, based on the degree of deterioration of the precatalyst detected by the at least one controller,
   wherein the higher the degree of deterioration of the precatalyst is, the higher the maximum values of the engine torque and the engine revolution number in the recovery control prohibition range set by the at least one controller are.

2. An exhaust gas purification system for an internal combustion engine as recited in claim 1, wherein
   the at least one controller is configured to execute an exhaust gas temperature raising control for raising the temperature of exhaust gas from the internal combustion engine, and
   if an operation state of the internal combustion engine falls within the recovery control prohibition range at a time when a condition for executing the recovery control is met, the exhaust gas temperature raising control is executed by the at least one controller, and thereafter the recovery control is executed by the at least one controller.

3. An exhaust gas purification system for an internal combustion engine as recited in claim 2, wherein, when the exhaust gas temperature raising control is executed by at least one controller, the higher the degree of deterioration of the precatalyst is, the higher the temperature to which the temperature of the exhaust gas from the internal combustion engine is raised is.

4. An exhaust gas purification system as recited in claim 1, wherein the exhaust gas purification apparatus is a NOx storage reduction catalyst, and the recovery control is a SOx poisoning recovery control for reducing SOx stored in the NOx storage reduction catalyst.

5. An exhaust gas purification system as recited in claim 1, wherein
the exhaust gas purification apparatus is a particulate filter, and
the recovery control is a filter regeneration control for removing particulate matter trapped on the particulate filter.

6. An exhaust gas purification system as recited in claim 2, wherein
the exhaust gas purification apparatus is a NOx storage reduction catalyst, and
the recovery control is a SOx poisoning recovery control for reducing SOx stored in the NOx storage reduction catalyst.

7. An exhaust gas purification system as recited in claim 3, wherein
the exhaust gas purification apparatus is a NOx storage reduction catalyst, and
the recovery control is a SOx poisoning recovery control for reducing SOx stored in the NOx storage reduction catalyst.

8. An exhaust gas purification system as recited in claim 2, wherein
the exhaust gas purification apparatus is a particulate filter, and
the recovery control is a filter regeneration control for removing particulate matter trapped on the particulate filter.

9. An exhaust gas purification system as recited in claim 3, wherein
the exhaust gas purification apparatus is a particulate filter, and
the recovery control is a filter regeneration control for removing particulate matter trapped on the particulate filter.

\* \* \* \* \*